United States Patent [19]

Nose et al.

[11] Patent Number: 5,073,455
[45] Date of Patent: Dec. 17, 1991

[54] THERMOPLASTIC LAMINATED FILM

[75] Inventors: Katsuhiko Nose; Katsuaki Kuze; Hideaki Tatsuta, all of Fukui, Japan

[73] Assignees: Toyo Boseki Kabushiki Kaisha, Osaka; Kabushiki Kaisha Boron International, Tokyo, both of Japan

[21] Appl. No.: 302,752

[22] Filed: Jan. 26, 1989

[30] Foreign Application Priority Data

Jan. 26, 1988 [JP] Japan .................................. 63-15091
Jul. 29, 1988 [JP] Japan ................................ 63-190965

[51] Int. Cl.$^5$ ............................................. B32B 27/00
[52] U.S. Cl. .................................. 428/411.1; 428/355; 428/420; 428/423.1; 428/480; 428/704; 525/185; 525/389
[58] Field of Search ............... 428/420, 204, 497, 500, 428/502, 355, 416.1, 423.1, 480

[56] References Cited

U.S. PATENT DOCUMENTS 4,302,506 11/1981 Heberger ........................... 428/341

FOREIGN PATENT DOCUMENTS 068380 5/1983 European Pat. Off. .
078559 5/1983 European Pat. Off. .
081926 6/1983 European Pat. Off. .

OTHER PUBLICATIONS

Abstract of Japanese Patent 63-288,747, Nose et al., 11/88.

Primary Examiner—John C. Bleutge
Assistant Examiner—David Buttner
Attorney, Agent, or Firm—Leydig, Voit & Mayer

[57] ABSTRACT

A thermoplastic laminated film that has satisfactory adhesiveness to hydrophilic polymers, hydrophobic polymers, and inorganic substances is provided. The film comprises a base film made of thermoplastic resin and a layer formed on at least one side of said base film, wherein said layer is made of a composition comprising (a) at least one selected from the group consisting of water-soluble resins, water-emulsifiable resins, and water-dispersible resins, and (b) an organic boron polymer or a mixture composed of an organic boron polymer and vinyl alcohol polymer.

8 Claims, No Drawings

THERMOPLASTIC LAMINATED FILM

BACKGROUND OF THE INVENTION

1. Field of the Invention

This invention relates to a thermoplastic laminated film with excellent adhesiveness, and in particular, to a thermoplastic laminated film with excellent adhesiveness to hydrophilic polymers, hydrophobic polymers, and inorganic substances.

2. Description of the Prior Art

Films made of thermoplastic resins such as polyester, polyamide, polypropylene, etc., and especially, films made of polyester such as polyethylene terephthalate, have excellent mechanical strength, heat-resistance, resistance to chemicals, translucency, and stability of dimensions. Therefore, such films have a wide variety of uses such as for the base film for magnetic tape, insulating tape, photographic film, tracing film, wrapping film for foodstuffs, and the like. However, these thermoplastic films ordinarily have poor adhesiveness to hydrophilic polymers, hydrophobic polymers, and inorganic substances. Accordingly, when this kind of film is coated with magnetic substances, photosensitive agents, matting agents, etc., the film surface should be treated by a corona discharge so that an anchor layer is provided. Also, when this kind of film is covered with a printed layer or a heat-sealable layer so that the film can be used for the wrapping of foodstuffs, the adhesion of the layer to the thermoplastic film is weak. Therefore, the strength of the heat seal, for example, is very weak.

In addition to the above methods for the improvement of the adhesiveness of thermoplastic films, other methods have been suggested for the treatment of the film by ultraviolet light, plasma discharge, flame treatment, corona discharge in a nitrogen atmosphere, and other physical methods. It is also possible to combine the use of these physical methods with chemical methods such as alkaline treatment, primer treatment, and the like. However, whatever the method is, the improvement achieved in the adhesiveness of the thermoplastic film is insufficient. In particular, the adhesiveness to hydrophilic polymers and hydrophobic polymers is unsatisfactory. Also, of the methods listed above, when that of primer treatment, in particular, is carried out, generally, the slipperiness of the film obtained is decreased, and therefore, operations such as rolling up of the film are made more difficult.

SUMMARY OF THE INVENTION

The thermoplastic laminated film of this invention, which overcomes the above-discussed and numerous other disadvantages and deficiencies of the prior art, comprises a base film made of thermoplastic resin and a layer formed on at least one side of said base film, wherein said layer is made of a composition comprising (a) at least one film-forming material selected from the group consisting of water-soluble resins, water-emulsifiable resins, and water-dispersible resins, and (b) an organic boron polymer or a mixture composed of an organic boron polymer and vinyl alcohol polymer, said organic boron polymer being at least one of the polymers having a repeating unit I or II:

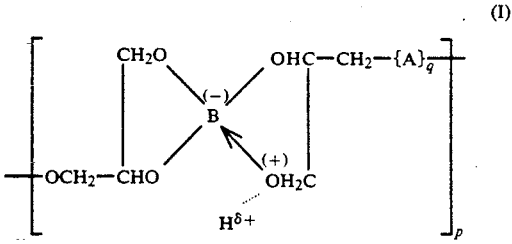

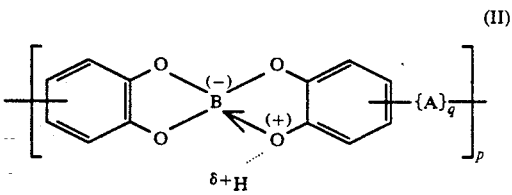

wherein p is 10 to 10,000; q is 0 or 1; and when q is 1, A is $-(X)_l-(Y)_m-(Z)_n-$, wherein X and Z are independently hydrocarbylenes (i.e., hydrocarbon groups) with an ether linkage and containing 100 carbon atoms or less; Y is

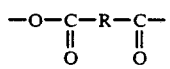

wherein R is hydrocarbylene (i.e., a hydrocarbon group) containing 1 to 34 carbon atoms, or

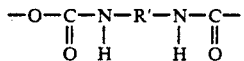

wherein R' is hydrocarbylene containing 2 to 13 carbon atoms, and l, m, and n are independently 0 or 1.

Accordingly, the invention described herein makes possible the objectives of (1) providing a thermoplastic laminated film that has satisfactory adhesiveness to hydrophilic polymers, hydrophobic polymers, and inorganic substances; (2) providing a thermoplastic laminated film that, in addition to the above properties, has satisfactory slipperiness, so that blocking does not take place, and handling is easy; (3) providing a thermoplastic laminated film suitable for the following uses: (a) as a base film for magnetic tape (for use in audio, video, and computer applications); (b) as a wrapping film for various kinds of goods such as foods, drugs, fertilizers, and the like (including as a base film for wrapping films on which a metal layer is deposited); (c) as a base film for films for use in plastic greenhouses in agriculture; and (d) for other general industrial uses as a base film for tracing film, as a base film for membrane-shaped switches, as a base film for stamping film (stamping foil), as a base film for adhesive tape, as a base film for films used in lettering devices (i.e., embossing devices), as a base film for OHP sheets, as name plates, as a base film for mirrors, as a base film for photoresists, as a base film for printing ribbons for use in word processors and the like, as a base film for light filters that cut off some wavelengths or some proportion of light, as a base film for layouts, as a base film for printing paper, as a film for plain paper copies, as a base sheet for white boards, and as a base film for labels, cards, and stickers for display.

DESCRIPTION OF THE PREFERRED EMBODIMENT

The organic boron polymer that has a repeating unit I or II used in the thermoplastic laminated film of this invention can be made by the following methods.

(1) The following compound III or IV that has two glycerin residues at the termini of the molecule can be allowed to react with boric acid, triester of boric acid, or boric anhydride:

$$\underset{\underset{OH}{|}}{CH}-\underset{\underset{OH}{|}}{CH}-CH_2-\{A\}_q-OCH_2-\underset{\underset{OH}{|}}{CH}-\underset{\underset{OH}{|}}{CH_2} \quad (III)$$

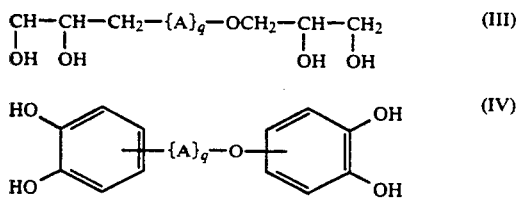

wherein q is 0 or 1; and when q is 1, A is —(X)$_l$—(Y)$_m$—(Z)$_n$—, wherein X and Z are independently hydrocarbylenes with an ether linkage at their termini and containing 100 carbon atoms or less; Y is

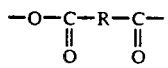

wherein R is hydrocarbylene containing 1 to 34 carbon atoms, or

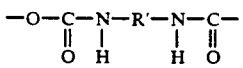

wherein R' is hydrocarbylene containing 2 to 13 carbon atoms, and l, m, and n are independently 0 or 1.

As the triester of boric acid, esters obtained from boric acid and a lower alcohol that contains 4 or less carbon atoms can be used. Per mole of compound III or IV, 1 mole of boric acid and/or triester of boric acid is used, or 0.5 mole of boric anhydride is used.

(2) By the addition of ethylene oxide, etc., to di(glycerin)borate or di(catechol)borate; or to a diol that contains a di(glycerin)borate residue or a di(catechol)borate residue, both of which have 206 or fewer carbon atoms; polyetherification is accomplished. Alternatively, equimolecular amounts of a dicarboxylic acid that contains 3-36 carbon atoms and the di(glycerin)borate, di(catechol)borate, or diol mentioned above are reacted. Instead of the dicarboxylic acid, an ester obtained from the dicarboxylic acid and alcohol with 4 or fewer carbon atoms, a halide of the dicarboxylic acid, or a diisocyanate with 4 to 15 carbon atoms may be used.

In the preparative method 1 or 2, two or more of the starting materials can be used. For example, it is possible to use a combination of two or more of the compounds of the structural formula III, the compounds having different groups with regard to —{A}q—.

As the organic boron polymer obtained in this way, the following compounds are included:

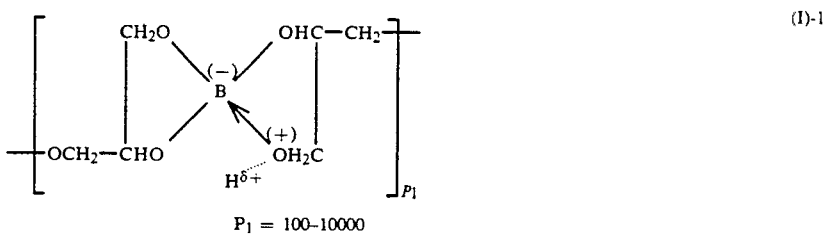

(I)-1

$P_1$ = 100–10000

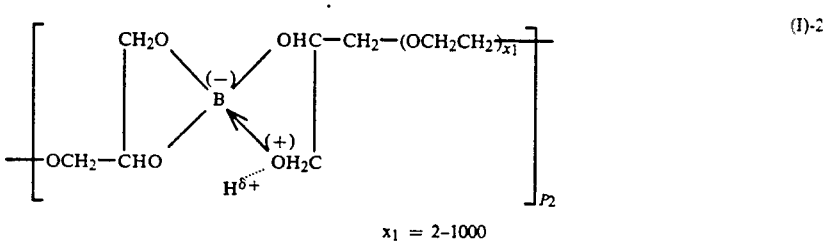

(I)-2

$x_1$ = 2–1000
$P_2$ = 5–5000

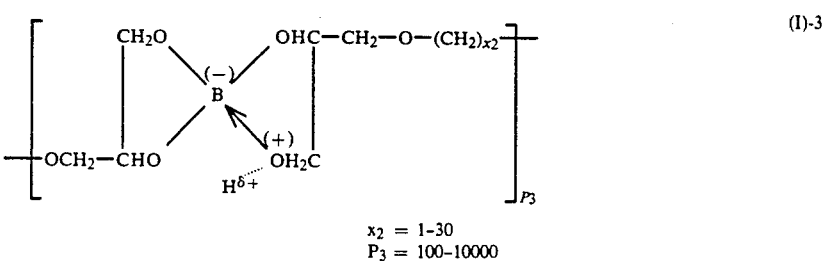

(I)-3

$x_2$ = 1–30
$P_3$ = 100–10000

-continued
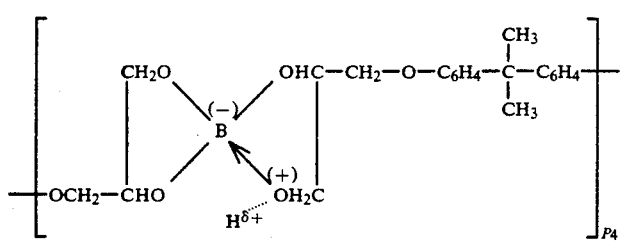
(I)-4
$P_4 = 50-5000$
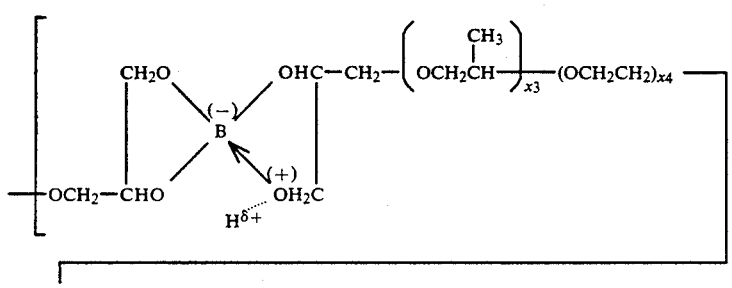
(I)-5
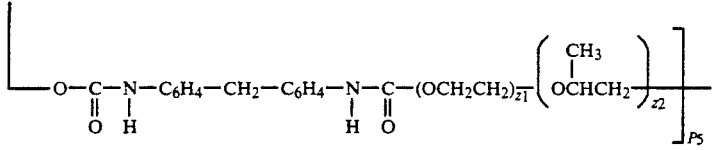
$x_3 = 5-100$
$x_4 = 1-50$
$z_1 = 1-50$
$z_2 = 5-100$
$P_5 = 5-500$
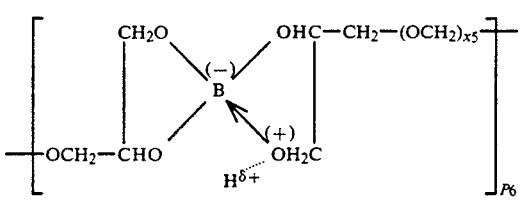
(I)-6
$x_5 = 10-1000$
$P_6 = 3-1000$
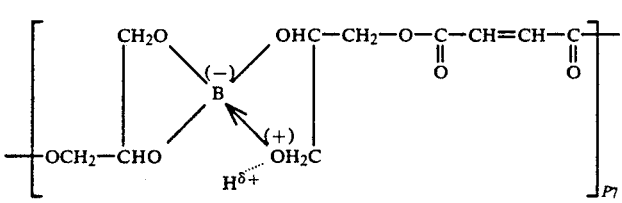
(I)-7
$P_7 = 10-5000$
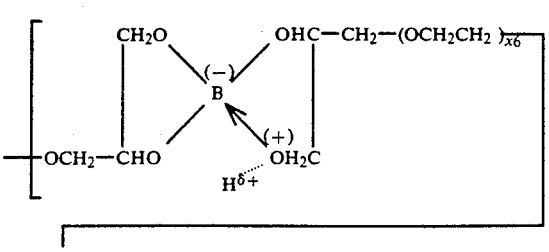
(I)-8

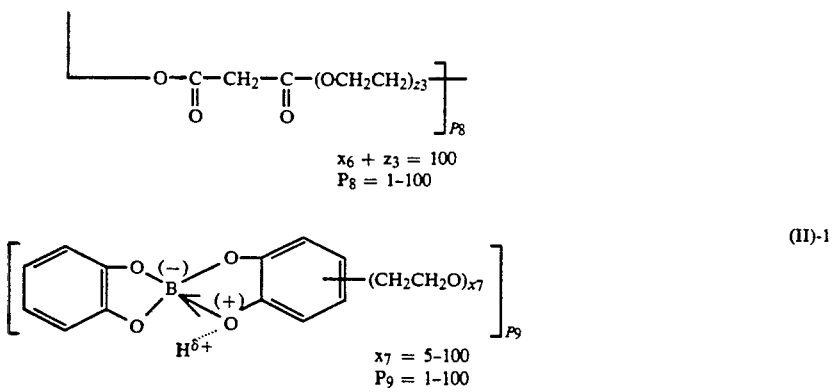

$x_6 + z_3 = 100$
$P_8 = 1-100$ $x_7 = 5-100$
$P_9 = 1-100$ (II)-1

In this invention, the vinyl alcohol polymer that is used with the organic boron polymer is as follows: Polyvinyl alcohol that is obtained by the saponification of polyvinyl acetate, in which the degree of saponification is 100 mole % and the degree of polymerization is 100–300; partially saponified polyvinyl alcohol obtained by the saponification of polyvinyl acetate, with the degree of saponification of 70 mole % or more and the degree of polymerization of 100–3000; compounds obtained by the saponification of the result of the copolymerization of vinyl esters and other monomers; derivatives obtained by the chemical modification of these compounds; etc. Partially saponified polyvinyl alcohol with a degree of saponification of 85 mole % or more and completely saponified polyvinyl alcohol with the degree of polymerization of 200 or more are particularly suitable.

The organic boron polymer I or II and PVA are mixed in an aqueous solvent to form a solution or suspension of these polymers, and the solution or suspension is heated as needed. The relative proportions by weight of the organic boron polymer I or II and PVA in the mixture can be 5:95–95:5, and preferably 10:90–50:50. To specify in more detail, for example, an aqueous solution of PVA is made, and to this, the organic boron polymer I or II is added dropwise with agitation. At this time, the reaction temperature is 20°–100° C., and preferably 50°–80° C. In the solution or suspension, it appears that the PVA backbones are bridged to each other by the organic boron polymer.

The composition used for the film of this invention comprises at least one film-forming material selected from the group consisting of water-soluble resins, water-emulsifiable resins, and water-dispersible resins. Water-soluble resins include natural resins, semi-synthetic resin, and synthetic resins. Natural resins include starch, sodium alginate, and proteins such as gelatin. Semi-synthetic resins include, for example, cellulose-type resins such as carboxymethylcellulose, and hydrolysis products of starches such as soluble starch. Synthetic resins include, for example, salts of poly(meth)acrylic acid, copolymers that contain a salt of (meth)acrylic acid, polyethyleneoxide, and derivatives thereof. The synthetic polymer also includes epoxy resins prepared by the use of epoxide, polyhydric alcohol such as ethylene glycol or pentaerythritol; acrylic resins, polyester resins, polyurethane resins, polyamide resins, phenol resins, urea resins, melamine resins, silicone resins, polyolefin resins, polyether resins, and the like that contain large proportions of hydrophilic groups such as sulfonic acid residues, phosphinic acid residues, ammonium groups, etc.

Water-emulsifiable resins and water-dispersible resins include polyolefins such as polybutadiene, etc.; rubbers such as poly(styrene-butadiene), poly(acrylonitrile-butadiene) etc.; vinyl resins such as polyvinyl acetate, polyvinyl chloride, polyvinylidene chloride, and other vinyl copolymers; acrylic resins that are obtained from acrylic acid, methyl methacrylate, hydroxymethyl acrylate, stryrene, glycidyl methacrylate, methyl acrylate, ethyl acrylate, etc.; polyester resins that are obtained from a dicarboxylic acid such as isophthalic acid, adipic acid, or sebacic acid, and a glycol such as ethylene glycol, diethylene glycol, neopentyl glycol, polyethylene glycol, or polytetramethylene glycol; polyurethanes obtained from the glycols mentioned above and diisocyanates. Water-emulsifiable resins and water-dispersible resins further include phenol resins, urea resins, melamine resins, furan resins, alkyd resins, unsaturated polyester resins, diallyl phthalate resins, epoxy resins, polystyrene, acrylonitrile-butadiene-styrene copolymer, fluorocarbon resins, polyamide resins, polyacetal resins, polycarbonate, polyphenylene oxide, polysulfone, cellulose-type resins, proteins, polyether resins such as polyethersulfone and polyether-ether ketone, polyphenylenesulfide, etc.

As water-emulsifiable resins and water-dispersible resins, there are, in addition, polymers that can be dispersed in aqueous solvents because of their hydrophilic groups, and also polymers that can be dispersed in aqueous solvents with the addition of a small amount of dispersant because of their hydrophilic groups. The hydrophilic groups include phosphonic acid residue, phosphinic acid residue, sulfonic acid residue, ammonium group, carboxyl group, etc. Resins that contain the said hydrophilic groups include polyester, polyurethane, polyamide, acrylic resins, epoxy resins, polyolefin resins, etc.

The water-emulsifiable resins and water-dispersible resins can be prepared effectively, for example, from monomers by the emulsion polymerization method with the monomers in an emulsified state. Of course, other ordinary methods of preparation can also be used. By the dispersion into an emulsified state in water of the polymers obtained with the use of surfactants and/or organic solvents, the film described below can be effectively prepared.

Of the resins listed as water-soluble resins, water-emulsifiable resins, and water-dispersible resins, polyester resins, polyurethane resins, and acrylic resins are particularly suitable. The details of these resins are as follows.

The polyester is prepared by reacting a dicarboxylic acid and a glycol. Dicarboxylic acid includes aromatic dicarboxylic acids such as terephthalic acid, isophthalic acid, orthophthalic acid, 1,5-naphthal acid, etc.; aromatic oxycarboxylic acids such as p-oxybenzoic acid, p-(hydroxyethoxy) benzoic acid; aliphatic dicarboxylic acids such as succinic acid, adipic acid, azelaic acid, sebacic acid, dodecanedioic acid; unsaturated aliphatic dicarboxylic acids such as fumaric acid, maleic acid, itaconic acid, tetrahydrophthalic acid; alicyclic dicarboxylic acids such as hexahydrophthalic acid; and tri- or tetra carboxylic acids such as trimellitic acid, trimesic acid, pyromellitic acid, etc.

The glycol that is used for the preparation of the polyester includes diols such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, ethylene oxide adducts of bisphenol A, propylene oxide adducts of bisphenol A, ethylene oxide adducts of hydrogenated bisphenol A, propylene oxide adducts of hydrogenated bisphenol A, polyethylene glycol, polypropylene glycol, polytetramethylene glycol, and the like. In addition to the above-mentioned diols, triols and/or tetraols can be used, examples of which include trimethylol ethane, trimethylol propane, glycerin, pentaerythritol, etc. Furthermore, the glycol includes polyesterpolyols (i.e., diols having relatively high molecular weights), examples of which include polyesterdiols obtained by the ring-opening polymerization of lactones such as ε-caprolacton.

As described above, the resins contained in the composition used for the film of this invention such as the polyester described above and polyurethane resins and acrylic resins that will be described below can have hydrophilic groups. Examples of suitable hydrophilic groups for the polyester and polyurethane resins and of compounds (monomers) that contain such groups are as follows:

(1) —COOM wherein M is hydrogen, alkali metal, tetraalkylammonium, or tetraalkylsulfonium.

Oxycarboxylic acids such as polycarboxylic acids, glyceric acid, dimethylolpropionic acid, N,N-diethanolglycine, hydroxyethyloxy benzoic acid; aminocarboxylic acids such as diaminopropionic acid, diaminobenzoic acid; and derivatives thereof.

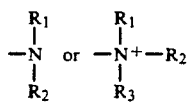

wherein $R_1$, $R_2$ and $R_3$ are independently hydrogen, alkyl containing 1 to 8 carbon atoms, aryl or aralkyl.

Alcohols that contain nitrogen, such as N-methyldiethanolamine, 2-methyl-2-dimethylaminomethyl-1,3-propanol, and 2-methyl-2-dimethylamino-1,3-propanediol.

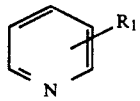

wherein $R_1$ is the same as defined above.

Compounds that contain a pyridine ring, such as picolinic acid, dipicolinic acid, aminopyridine, diaminopyridine, hydroxypyridine, dihydroxypyridine, aminohydroxypyridine, pyridinedimethanol, pyridine propanol, pyridineethanol, etc.

(4) —SO$_3$M wherein M is the same as defined above.

Polycarboxylic acids and derivatives thereof such as 5-sodium sulfoisophthalic acid, sulfoisophthalic acid, sodium sulfosuccinic acid; sodium sulfohydroquinone, and alkylene oxide adducts thereof; sodium sulfobisphenol A and alkylene oxide adducts thereof; etc.

(5) Hydrophilic groups that contain phosphorus

wherein $R_4$ is a trivalent hydrocarbon group that contains 3-10 carbon atoms; $R_5$ is alkyl that contains 1-12 carbon atoms, cycloalkyl, aryl, alkoxy that contains 1-12 carbon atoms, cycloalkoxy, or aryloxy, wherein the said aryl and aryloxy groups can be substituted with halogen, hydroxy —OM$_2$ (M$_2$ is an alkaline metal), or amino; $R_6$ and $R_7$ are independently alkylene that contains 1-12 carbon atoms, cycloalkylene, arylene, or a group shown by the formula (—CH$_2$—OR$_8$—)$_r$, wherein the said R$_8$ is alkylene that contains 1-12 carbon atoms, cycloalkylene, or arylene, and r is an integer 1-4; and M$_1$ is an alkaline metal, hydrogen, a monovalent hydrocarbon group, or amino.

EXAMPLES OF COMPOUNDS SHOWN BY FORMULA V-1

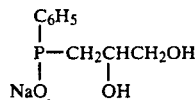

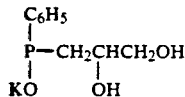 (V)-1-2

EXAMPLES OF COMPOUNDS SHOWN BY FORMULA V-2

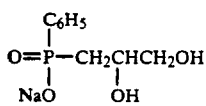 (V)-2-1

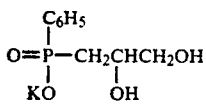 (V)-2-2

EXAMPLES OF COMPOUNDS SHOWN BY FORMULA V-3

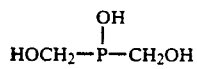 (V)-3-1

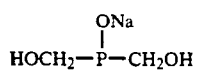 (V)-3-2

EXAMPLES OF COMPOUNDS SHOWN BY FORMULA V-4

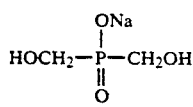 (V)-4-1

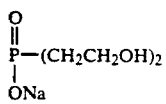 (V)-4-2

EXAMPLES OF COMPOUNDS SHOWN BY FORMULA V-5

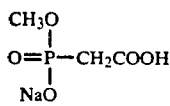 (V)-5-1

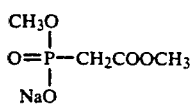 (V)-5-2

The polyester is prepared by the use of the carboxylic acid component, the glycol component, and the monomer with a hydrophilic group if needed. Generally, the fusion-polycondensation method is employed for the preparation of the polyester. For example, the polyester is prepared by the direct esterification method, in which the components listed above are allowed to react directly with each other to polycondense them with removal of the water that is produced. Alternatively, the ester exchange method can be employed in which the dimethyl ester of the carboxylic acid component and the glycol component are allowed to react with each other to polycondense them with the removal of the methanol that is produced. In addition to the melt-polycondensation method, it is possible to use the solution-polycondensation method, the surface-polycondensation method, etc.

Of the resins that can be included in the composition used for film of this invention, polyurethane can be prepared, for example, by the chain extension of polyalkyleneglycol, etc., with polyisocyanate; or the chain extension of polyesterpolyol with polyisocyanate, wherein the polyesterpolyol is obtained by the polycondensation of carboxylic acid and glycol components.

As the polyalkylene glycol, polyethylene glycol, polybutylene glycol, polypropylene glycol, etc., can be used. As the carboxylic acid component and the glycol component that are starting materials for the polyester polyol, it is possible to use the carboxylic acid components and the glycol components listed above for the preparation of the polyester. The polyisocyanate mentioned above includes diisocyanates such as 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate diphenylether, 1,5'-naphthalene diisocyanate, p-xylylene diisocyanate, m-xylylene diisocyanate, methylcyclohexane 1,3-diisocyanate, methylcyclohexane 1,4-diisocyanate, dicyclohexane 4,4'-diisocyanate, cyclohexylmethane 4,4'-diisocyanate, isophorone diisocyanate, and the like. These polyisocyanates can incorporate triisocyanates such as the trimer of 2,4-tolylene diisocyanate and the trimer of hexamethylene diisocyanate so that the amount of the isocyanate groups of these compounds is at the proportion of 7 mole % or less with respect to the total isocyanate groups.

The polyurethane can be prepared from the components listed above by ordinary methods. It is also possible to use a monomer with the hydrophilic groups mentioned in the preparation of polyester so that it is incorporated into the polyurethane backbone.

The acrylic resin can be prepared by the polymerization of acrylic acid or its derivatives, and monomers with vinyl groups other than acrylic acid or the derivatives thereof if needed. As the monomers that can be used, the following compounds are included:

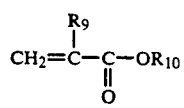 (VI)-1 wherein $R_9$ is alkyl containing 1 to 4 carbon atoms and $R_{10}$ is alkyl containing 1 to 8 carbon atoms.

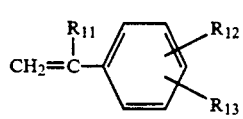 (VI)-2 wherein $R_{11}$ is H or alkyl containing 1 to 4 carbon atoms and $R_{12}$ and $R_{13}$ are independently hydrogen atoms or alkyls containing 1 to 8 carbon atoms.

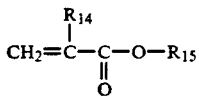

wherein $R_{14}$ is H or alkyl containing 1 to 4 carbon atoms; $R_{15}$ is H, $-(CH_2)_s-OH$, $-(CH_2)_s-OR_{16}$, $-\{(CH_2)_s-O-\}_t-R_{17}$ or

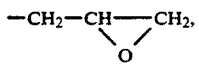

wherein s and t are independently integers from 1 to 3, and $R_{16}$ and $R_{17}$ are independently alkyls containing 1 to 4 carbon atoms.

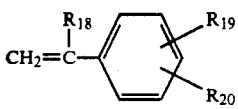

wherein $R_{18}$ is H or alkyl containing 1 to 4 carbon atoms; and $R_{19}$ and $R_{20}$ are independently Cl, —OH or alkoxy containing 1 to 8 carbon atoms.

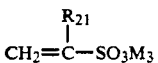

wherein $R_{21}$ is H or alkyl containing 1 to 4 carbon atoms; and $M_3$ is H, alkali metal, or —NH$_4$.

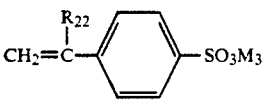

wherein $R_{22}$ is H or alkyl containing 1 to 4 carbon atoms; and $M_3$ is the same as defined above.

$$CH_2=CHSO_5R_{23} \quad \text{(VI)-5-3}$$

wherein $R_{23}$ is H or alkyl containing 1 to 8 carbon atoms.

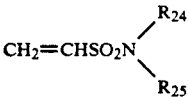

wherein $R_{24}$ and $R_{25}$ are independently H or alkyl containing 1 to 4 carbon atoms.

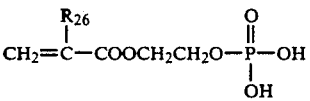

wherein $R_{26}$ is H or alkyl containing 1 to 4 carbon atoms.

The compounds shown by formula VI-1 include (meth)acrylic acid, lower alkyl esters of (meth)acrylic acid, etc. (Meth)acrylic acid means acrylic acid and/or methacrylic acid. The lower alkyl group of the ester mentioned above includes methyl, ethyl, propyl, butyl, amyl, hexyl, heptyl, octyl, and 2-ethylhexyl. Compounds shown by the formula VI-2 include styrene; o-, m-, or p-monoalkylstyrene, the alkyl group of which is, for example, methyl, ethyl, propyl, butyl, amyl, hexyl, heptyl or octyl; 2,4-, 2,5-, 2,6-, 3,4-, or 3,5-dialkylstyrene; 2,4,5- or 2,4,6-trialkylstyrene, 2,3,4,5-tetraalkylstyrene; α-substituted derivatives of styrene and the said styrene derivatives; and the like. Compounds shown by formula VI-3 include hydroxyalkylesters of (meth)acrylic acid, alkoxyalkylesters of (meth)acrylic acid, alkyl alkyleneglycolesters of (meth)acrylic acid, glycidylesters of (meth)acrylic acid. Compounds shown by formula VI-4 and their analogs include halogenated styrene such as o-, m-, or p-chlorostyrene, 2,3-, 2,4-, 2,5-, 2,6-, 3,4-, or 3,5-dichlorostyrene, 2,3,4- or 2,4,5-trichlorostyrene, tetrachlorostyrene, or pentachlorostyrene; styrenes substituted with halogen and alkyl such as 2-chloro-5-methylstyrene, 4-chloro-3-methylstyrene, p-chloromethylstyrene; hydroxy- and/or alkoxystyrenes such as o-, m-, or p-hydroxystyrene, o-, m-, or p-methoxystyrene, o-, m-, or p-ethoxystyrene, 3-methoxy-4-hydroxystyrene, etc. Compounds shown by formula VI-5-1 to VI-5-4 include ethylenesulfonic acid and alkali metal salts thereof, the alkali metal of which includes sodium, potassium, etc.; vinylalkyl sulfones such as vinylbutylsulfone; vinylsulfonamides such as vinylsulfonamide, vinylsulfonanilide, vinyl sulfonemethylanilide, etc.; styrenesulfonic acid and alkali metal salts thereof, the alkali metal of which includes sodium, potassium, etc.; mono-(2-methacryloyloxyethyl)acidphosphate, mono-(2-acryloyloxyethyl)acidphosphate, etc. Among these compounds, (meth)acrylic acid, glycidyl(meth)acrylate, mono-(2-(meth)acryloyloxyethyl)acidphosphate, and hydroxyethyl(meth)acrylate are especially preferable.

The acrylic resin can be prepared by ordinary methods from the monomers listed above. For example, it can be prepared by the suspension polymerization method, in which the monomers mentioned above are polymerized in an aqueous solvent in the presence of a water-soluble initiator. As the initiator, ceric ammonium nitrate, ceric ammonium sulfate, potassium persulfate, ammonium persulfate, hydrogen peroxide, etc., can be used.

The polymerization reaction generally should be carried out at the temperature of 0°-100° C., and preferably within the limits of 5°-80° C. When the reaction temperatures are below 0° C., the rate of polymerization slows, and when the reaction temperatures are above 100° C., the initiator is decomposed; thus, stability of the reaction system declines and gelatin readily occurs. In addition to the suspension polymerization method, the solution polymerization method and the bulk polymerization method also can be used.

The main components of the resin composition used in this invention are (a) at least one film-forming material selected from the group consisting of a water-soluble resin, a water-emulsifiable resin, and a water-dispersible resin (hereinafter, these resins are referred to as aqueous resins), and (b) an organic boron polymer or a mixture of the organic boron polymer and the vinyl alcohol polymer. The relative proportions (w/w) of the aqueous resin and the organic boron polymer or the mixture are 95/5 to 5/95, and preferably 80/20 to 20/80. When the water-type resin is less than 5% by weight, the adhesion of the film obtained to hydrophobic polymers is slightly decreased. When the amount of the organic boron polymer or the mixture is less than 5% by weight, the adhesion of the film obtained to hydrophilic polymers is slightly decreased. The composition may comprise such components as coloring agents, anti-static agents, crosslinking agents, anti-blocking agents, lubricants such as inert particles (e.g., inorganic or organic fine particles), other polymers, ultraviolet absorbents, anti-aging agents, and the like as needed, at proportions that do not change the properties of the film obtained. Examples of the anti-static agent include surfactants; particles of metal such as palladium, silver, etc.; metal oxides such as indium oxides, tin oxides; charge transfer complexes such as tetracyanoquinodimethane complex. Examples of the crosslinking agent include polyfunctional reactive compounds containing within their molecules at least two functional groups such as epoxy, aziridinyl, isocyanate or Bunte salt thereof, blocked isocyanate, alkoxy, alkylol, vinylsulfone, vinylsulfone donor, acryloyl and active hologen. Examples of the inert particle include particles of calcium carbonate, kaolin, alminum silicate, calcium silicate, silica, or crosslinked benzoguanamine resins.

As the thermoplastic film (i.e., the base film) on which the layer that contains the above composition is provided, films made of polyester, polyamide, polycarbonate, polyphenylenesuifide, polyetherimide, polyethersulfone, polyolefins, cellulose and derivatives thereof, PVA, acrylic resin, polyvinylchloride and derivatives thereof, etc., can be used. The most appropriate material for the base film can be selected according to the use of the laminated film that is obtained or according to need. The materials with the greatest general usefulness are films made of polyester, polyamide, polycarbonate, cellulose-type resin, etc.

The base film can be obtained by melting and extrusion processes of the thermoplastic resin or by the casting of a solution of the resin. The non-stretched film obtained can be stretched along a uniaxial direction or biaxial directions as needed, and then the above composition is applied to its surface by a method to be described below. From the point of view of causing a good adhesion between the base film and the composition, providing a laminated film with excellent slipperiness, and providing a durable laminated film, it is preferable to apply the composition to the base film that is unstretched or else stretched along a uniaxial direction, after which the whole can be stretched as needed. Biaxially oriented base film generally has a wide film width, and because the composition is applied thinly to this base film, it is necessary to speed up the movement of the film when the composition is applied, so it is somewhat difficult to apply the composition to the base film uniformly.

The thermoplastic laminated film of this invention can be prepared by the following procedure. First, the composition is dissolved, dispersed, or emulsified in water or in an aqueous solvent. This is done, for example, by the method of addition of an organic boron polymer or a mixture obtained from an organic boron polymer and vinyl alcohol polymer to latex made of the aqueous resin; by the method of addition of water or an aqueous solvent to a mixture of fused state of the aqueous resin and the organic boron polymer or the mixture with kneading; or the like. As the aqueous solvent, it is possible to use, for example, a solvent that contains an organic solvent at the proportion by weight of 50% or less such as alcohols (e.g., methyl alcohol, ethyl alcohol, isopropyl alcohol) in addition to water. The purposes of including the organic solvent are to improve the ease of coating the base film with the application fluid that contains the composition, and the purpose of improving the drying of the film after the application. Because the proportion of the organic solvent is 50% by weight or less, there is no danger of the application fluid being inflammable or explosive. As an additive to the composition for the purpose of improving the operation of coating, it is recommended that substances such as fluororesins, silicone resins, surfactants, and the like are used. The application fluid containing this composition is generally applied to the surface of the base film at the amount of 0.003-5 g/m$^2$, and preferably 0.01-3 g/m$^2$. If less than 0.003 g/m$^2$ is used, the adhesiveness of the film obtained to other resins that are applied on the film is poor, and if more than 5 g/m$^2$ is used, the slipperiness and the anti-blocking properties of the film obtained are poor.

In addition to the coating method in which the application fluid is prepared and coated on the base film, other methods that can be used include the extrusion coating method, extrusion laminating method, the dry laminating method, the hot-melt adhesion method, etc.

Before lamination is done by the application of the resin composition, or after such lamination is done, it is possible to treat the surface of the base film or the surface of the resin composition layer by corona discharge in the air or in a nitrogen atmosphere or by ultraviolet radiation. By the use of such treatment, the adhesiveness of the base film with the resin composition or the adhesiveness of the film obtained with other resins is further improved.

In the composition used in the film of this invention, there are included an organic boron polymer that has a specific structure or a mixture of said organic boron polymer and vinyl alcohol polymer, and an aqueous resin. Therefore, said composition has satisfactory adhesion to hydrophobic polymers, hydrophilic polymers, and inorganic substances. Therefore, the thermoplastic laminated film of this invention with a layer of this resin composition has satisfactory adhesiveness to hydrophobic polymers, hydrophilic polymers, and inorganic substances. Furthermore, on the surface of the layer of the resin composition that contains the mixture and the aqueous resin, minute indentations are formed. For that reason, the slipperiness of this kind of film is satisfactory.

EXAMPLES

Below, this invention will be explained with reference to examples.

EXAMPLE 1

(A) Preparation of a Thermoplastic Laminated Film

A polyester modified with sulfonic acid with a molecular weight of about 20,000 was synthesized using 50 mole % of terephthalic acid, 45 mole % of isophthalic acid, and 5 mole % of 5-sodium sulfoisophthalate as the dicarboxylic acid components, and 80 mole % of ethylene glycol and 20% neopentyl glycol as the glycol components. This polyester was dispersed in water to the concentration of 10% by weight, and to this mixture was added the organic boron polymer I-1 ($P_1 = 1000$) at the concentration of 30% by weight with respect to said polyester.

Separately, polyethylene terephthalate (PET) was extruded at the temperature of 280°-300° C., and a non-stretched film 1000 μm thick was obtained by cooling of the extrudate on cooling rollers at 15° C. This non-stretched film was passed through a pair of rollers heated to 85° C. that moved at different speeds, and stretched in its machine to 3.3 times of the original measurement. The dispersion mentioned above that contains a resin composition was applied to the surface of this film by use of the air-knife method and dried in a heated draft at 70° C., forming a coated layer composed of the resin composition. The film was stretched in the transverse direction by the use of tenterhooks to 3.3 times the original width at 98° C., and fixed at 200°-210° C., by which means a coated polyester film stretched in biaxial directions and 100 μm thick (with a resin composition layer 0.15 μm thick) was obtained.

(B) Evaluation of the Thermoplastic Laminated Film

A 10% aqueous solution of polyvinyl alcohol (a hydrophilic polymer) and a solution of polyvinyl chloride (hereinafter referred to as PVC; a hydrophobic polymer) in 10% dimethylformamide were prepared. The solutions were colored by the addition of a red dye, and these colored solutions were used separately to print one side of the thermoplastic laminated film obtained in section A above. The colored solutions were applied to the surface of its resin composition layer at the rate of 2 g of resin/m$^2$, resulting in a red layer.

The colored layer of this printed film was cut with a knife in a checkerboard pattern with incisions 1 mm apart, forming 100 squares on the film surface. The printed surface of the film was covered uniformly with adhesive tape (L-pack, Nichiban Co.), and the tape was removed rapidly by being pulled off at a 180° angle. The surface was treated in this way for a total of three times, and the number of squares remaining on the surface was counted. The results are shown in Table 1.

The evaluation of adhesion in Examples 2-19 and Comparative Examples 1-5 described below was done in the same way as in this Example.

EXAMPLES 2 AND 3

The same procedures were repeated as in Example 1 except that the organic boron polymers listed in Table 1 were used. The results of the evaluation of the adhesiveness of the thermoplastic laminated films obtained are in Table 1. The results for Examples 4 and 5 and for Comparative Example 1 and 2 described below are also given in Table 1.

EXAMPLES 4 AND 5

The same procedures were repeated as in Example 1 except that the amount of the organic boron polymer used with respect to the polyester was changed as shown in Table 1.

COMPARATIVE EXAMPLE 1

The same procedure was repeated as in Example 1 except that coating with a dispersion of polyester and an organic boron polymer was not done.

COMPARATIVE EXAMPLE 2

The same procedure was repeated as in Example 1 except that the organic boron polymer was not used.

TABLE 1

| | Organic Boron Polymer | | Adhesiveness (Number of Squares) | |
|---|---|---|---|---|
| | Kind | Amount (wt %) | PVA | PVC |
| Example 1 | (I)-1 ($P_1 = 1000$) | 30 | 100 | 100 |
| Example 2 | (I)-8 $X_6 + Z_1 = 1000$ $P_8 = 2$ | 30 | 100 | 100 |
| Example 3 | (I)-5 $X_3 = 32$ $X_4 = 2$ $P_5 = 20$ | 30 | 100 | 100 |
| Example 4 | (I)-1 ($P_1 = 1000$) | 2 | 40 | 100 |
| Example 5 | (I)-1 ($P_1 = 1000$) | 98 | 80 | 30 |
| Comparative Example 1 | — | — | 0 | 0 |
| Comparative Example 2 | — | — | 0 | 100 |

(a) Amount with respect to the amount of polyester

Table 1 shows that the adhesiveness of the thermoplastic laminated film of this invention to both PVA, which is a hydrophilic resin, and PVC, which is a hydrophobic resin, was satisfactory. When the amount of the organic boron polymer in the resin composition was either very high or very low, the adhesiveness decreased slightly, but compared to the film of Comparative Example 1 that did not have the coated layer (i.e., the resin composition layer), adhesiveness was greater. When there was no organic boron polymer in the composition (i.e., the film in Comparative Example 2), the adhesiveness to the hydrophilic resin was decreased.

EXAMPLE 6

(A) Preparation of a Thermoplastic Laminated Film

A polyester modified with sulfonic acid with a molecular weight of 4000 was obtained according to the method of Example 1 except that the reaction time was shortened. Then 100 parts by weight of this polyester was dissolved in a mixture of 72 parts by weight of methyl ethyl ketone and 72 parts by weight of toluene. To this solution, 21 parts by weight of 4,4'-diphenylmethane diisocyanate and 0.05 part by weight of dibutytin dilaurate were added, and a reaction was allowed to proceed for 3 hours at 70°-80° C. The solvent was evaporated off, and a dispersion in water that contained polyesterpolyurethane was obtained. To this, 50 parts by weight of an organic boron polymer (I-2; $x_1=9$, $P_2=10$) with respect to 100 parts by weight of the said polyesterpolyurethane was added, resulting in a coating liquid. With use of this coating liquid, a thermoplastic laminated film was prepared according to the method of Example 1.

(B) Evaluation of the Thermoplastic Laminated Film

To the coated layer of the thermoplastic laminated film obtained in section A above, a 10% solution of cellulose acetate butylate in Methyl cellosolve containing a small amount of red dye was applied at the rate of 2 g of resin/m$^2$. Cellulose acetate butylate is commonly used for photosensitive compositions, etc. Then, the Methyl cellosolve was evaporated to form a red layer made of cellulose acetate butylate.

The colored layer of this printed thermoplastic laminated film was cut with a knife in the same way as in Example 1 into a checkboard pattern with lines 1 mm apart and tested for peeling in the same way as in Example 1. All 100 squares remained.

EXAMPLE 7

An aqueous dispersion that contained polyester made in the same way as in Example 1 and an organic boron polymer (I-3; $x_2=6$, $P_3=500$) in the ratio of 3:1 (w/w) was prepared and applied to a polyethylene naphthalate film 100 μm thick so that the layer when dried would be 0.3 μm thick.

PVA or PVC was printed onto the coated surface of this thermoplastic laminated film in the same way as in Example 1, and the test of peeling was done. The results were expressed as the number of squares remaining. In all cases, all 100 squares remained.

EXAMPLE 8

(A) Preparation of a Polyurethane that Contained Phosphorus

In an autoclave equipped with a thermometer and an agitator, 485 parts by weight of dimethylterephthalate, 485 parts by weight of dimethylisophthalate, 409 parts by weight of ethylene glycol. 485 parts by weight of neopentyl glycol, and 0.68 parts by weight of titanium tetrabutoxide were placed and heated for 120 minutes at 150°-230° C. to allow ester exchange to take place. Next, 50.1 parts by weight of the compound V-2-2 that contains phosphorus that is disclosed in this specification was added, and a reaction was again allowed to proceed for 1 hour at 220°-230° C. The temperature of the reaction system was increased to 250° C. over the next 30 minutes, and then pressure of the system was gradually reduced to reach 10 mm Hg 45 minutes later. Under these new conditions, the reaction was again allowed to proceed for 60 minutes. The molecular weight of the polyester diol obtained (hereinafter referred to as polyester diol A) was 2500, and the amount of phosphorus that it contained was 1600 ppm.

Next, 100 parts by weight of the said polyester diol A was dissolved in a mixture of 72 parts by weight of toluene and 72 parts by weight of methyl ethyl ketone, and to the solution, 21 parts by weight of 4,4'-diphenylmethane diisocyanate and 0.05 parts by weight of dibutyltin dilaurate were added, and a reaction allowed to proceed for 3 hours at 70°-80° C.

(B) Preparation of a Thermoplastic Laminated Film

A mixture of 300 parts by weight of the polyurethane containing phosphorus obtained in section A above and 140 parts by weight of n-Butyl cellosolve was stirred for about 3 hours at 150°-170° C., giving a homogeneous sticky liquid. To this liquid was gradually added 560 parts by weight of water, and a homogeneous whitish dispersion in water (30% solids) was obtained after one hour.

To this aqueous dispersion, 150 parts by weight of an organic boron polymer (I-6; $X_5=200$, $P_6=10$) was added, and ethyl alcohol was added to dilute the mixture, resulting in a coating liquid in which the concentration of solids was 4.5%.

This coating liquid was applied to polyester film with an air knife coater, and dried in a draft heated at 120° C., resulting in a coated polyester film with a coat of 0.3 g/m².

(C) Evaluation of the Thermoplastic Laminated Film

Five kinds of resins were tested for adhesiveness to the film obtained in section B. The resins were 1) carboxymethylcellulose, 2) polyvinylidene chloride, 3) polyvinyl acetate, 4) gelatin, and 5) cellulose acetate butylate. A solution of each of the resins that contained a red dye compatible with the resin was applied to the surface of the film and dried, resulting in a resin layer 3 μm thick. The resin layer obtained was cut with a knife in the same way as in Example 1 into a checkerboard pattern with lines 1 mm apart, and a test of peeling was done. The results were that adhesiveness to each of the five resins was satisfactory; the number of squares remaining were 100 for resin 1, 95 for resin 2, 100 for resin 3, 100 for resin 4, and 90 for resin 5.

EXAMPLE 9

(A) Preparation of Acrylic Resin

| Monomer | mol % |
| --- | --- |
| Ethyl acrylate | 45 |
| Methyl methacrylate | 45 |
| Hydroxyethyl methacrylate | 6 |
| Glycidyl methacrylate | 2 |
| Sodium vinylsulfonate | 2 |

In a four-necked flask with a volume of 2 liters equipped with a condenser, 650 g of water, all of the sodium vinylsulfonate shown in the above table, and 1/5 of the amount of each of the other monomers were added. The total weight of the monomers were 350 g. Next, 0.85 g of dodecyl mercaptan and 0.05 g of potassium persulfate as catalyst were added. The temperature of the mixture was increased to 80° C. with stirring in an atmosphere of nitrogen, and the remaining amounts of the monomers and 0.15 g of the catalyst were gradually added at the same temperature over a period of 1.5 hr. The reaction mixture was stirred for an additional 1 hour at this temperature to complete the reaction. A stable and homogeneous latex milky white in color that did not contain any emulsifier was obtained.

(B) Preparation and Evaluation of a Thermoplastic Laminated Film

To 1,000 parts by weight of the latex obtained in section A, 150 parts by weight of an organic boron polymer (I-1; $P_1=1000$) was added, and water was then added so that the total weight of the mixture was 3,000 parts by weight. This coating liquid was used as in Example 1 and the layered film obtained was evaluated as in Example 1. The number of squares remaining was 100.

EXAMPLE 10

To 500 parts by weight of the acrylic latex obtained in section A of Example 9, 50 parts by weight of an organic boron polymer (I-4, $P_4=100$) was added, and to the mixture, water was added so that the total weight of the mixture would be 1500 parts by weight. This coating liquid was applied to cellulose acetate film 75 μm thick at the rate of 0.5 g resin/m², and dried for 2 min at 80° C. This film was evaluated for adhesion in the same way as in Example 1. The number of squares remaining was 100.

EXAMPLE 11

An aluminum layer was deposited at the thickness of 500 Å over the surface of the coated polyester film stretched in biaxial directions obtained in section A of Example 1 by the vacuum deposition method. The aluminum layer was cut with a knife in the same way as Example 1, and a test of peeling was done. The number of squares remaining was 100. Separately, instead of the aluminum, silicon dioxide was used for deposition (800 Å thick) by the sputtering method, and testing was done by the method of Example 1. The number of squares remaining was 100.

EXAMPLE 12

To an aqueous solution of polyvinyl alcohol with a degree of saponification of 88% and a degree of polymerization of 500, an organic boron polymer (I-1; $P_1 = 1000$) was added so that the ratio by weight of PVA to the organic boron polymer would be 1:4, and the mixture was stirred for 30 minutes at 40°–50° C., giving an aqueous solution. This aqueous solution of the mixture was added to a dispersion of the polyester modified with sulfonic acid obtained in section A of Example 1 so that the weight of the mixture of the organic boron polymer and the polyvinyl alcohol would be 50% by weight with respect to said polyester, giving a coating liquid.

Next, by the methods in Example 1, a PET film stretched in uniaxial direction was prepared, and the above coating liquid was applied to coat the film, after which the film was stretched as described in Example 1, giving a coated polyester film stretched in biaxial directions.

This film was tested by the methods of Example 1, and the results are shown in Table 2. Furthermore, by the methods of ASTM-1894, the friction coefficient was measured. These results are shown in Table 2.

COMPARATIVE EXAMPLE 3

Instead of the aqueous solution containing a mixture of PVA and an organic boron polymer, an aqueous solution of PVA (degree of saponification, 88%; degree of polymerization, 500) was used, and the other procedures were the same as those in Example 12. The results are shown in Table 2. The results from Comparative Examples 4 and 5 below also are shown in Table 2.

COMPARATIVE EXAMPLE 4

The same procedure was repeated as in Example 12 except for the use of a coating liquid of an aqueous dispersion of 10% by weight of the polyester obtained in section A of Example 12.

COMPARATIVE EXAMPLE 5

The same procedure was repeated except that the coating liquid was not applied.

TABLE 2

| | Resin Component | Adhesiveness (Number of Squares) | | Smoothness (Friction Coefficient) |
|---|---|---|---|---|
| | | PVA | PVC | |
| Example 12 | Polyester, Conjugate material | 100 | 100 | 0.45 |
| Comparative Example 3 | Polyester, PVA | 70 | 100 | 1.5 |
| Comparative Example 4 | Polyester | 20 | 90 | 2.0 or more |
| Comparative Example 5 | — | 0 | 40 | 2.0 or more |

Table 2 shows that the thermoplastic laminated film of this invention had excellent adhesiveness to both PVA, a hydrophilic polymer, and to PVC, a hydrophobic polymer, and that its slipperiness was satisfactory. When the film had a layer in which the components do not include a mixture of PVA and an organic boron polymer, or the film did not have a layer containing a resin composition, comparable results were not obtained.

EXAMPLE 13

A polyester modified with sulfonic acid with a molecular weight of 4000 was obtained according to the method of Example 1 except that the reaction time was shortened. Then, 100 parts by weight of this polyester was dissolved in a mixture of 72 parts by weight of methyl ethyl ketone and 72 parts by weight of toluene. To this solution, 21 parts by weight of 4,4'-diphenylmethane diisocyanate and 0.05 part by weight of dibutytin dilaurate were added, and a reaction was allowed to proceed for 3 hours at 70°–80° C. The solvent was evaporated off, and a dispersion in water that contained polyesterpolyurethane was obtained.

Separately, an organic boron polymer was added to an aqueous solution of PVA with a degree of saponification of 92% and a degree of polymerization of 650 to give a ratio by weight for the PVA and said organic boron polymer of 1:9, and by stirring for 30 minutes at 40°–50° C., an aqueous solution was obtained. As the organic boron polymer, I-8 ($X_6 + Z_3 = 100$; $P_8 = 2$) was used. To the aqueous suspension of the polyester polyurethane mentioned above, this aqueous solution was added so that the ratio by weight of the polyester polyurethane and the mixture would be 100:50, resulting in a coating liquid. This was used by the methods of Example 1 to prepare a thermoplastic laminated film. The film was evaluated by the same methods as in Example 12 for adhesiveness to PVA, and for slipperiness (i.e., friction coefficient was measured). The results are shown in Table 3.

EXAMPLE 14

The same procedure was repeated as in Example 13 except for the use of compound I-5 ($X_3 = 32$, $X_4 = 2$, $P_5 = 20$) as the organic boron polymer.

EXAMPLE 15

The same procedure was repeated as in Example 13 except for the use of compound I-2 ($X_1 = 9$, $P_2 = 10$) as the organic boron polymer.

TABLE 3

| | Adhesiveness (Number of Squares) PVA | Smoothness (Friction Coefficient) |
|---|---|---|
| Example 13 | 95 or more | 0.46 |
| Example 14 | 95 or more | 0.42 |
| Example 15 | 95 or more | 0.48 |

EXAMPLE 16

(A) Preparation of a polyurethane containing phosphorus

The same procedure was repeated as in section A of Example 8.

(B) Preparation and Evaluation of the Thermoplastic Laminated Film

First, 300 parts by weight of the polyurethane with phosphorus obtained in section A and 140 parts by weight of n-Butyl cellosolve were put in a vessel and stirred for about 3 hours at 150°–170° C., resulting in a homogeneous viscous liquid. To this liquid, 560 parts by weight of water was gradually added, resulting in a homogeneous whitish aqueous dispersion containing 30% solids after about an hour.

Separately, an organic boron polymer (I-6; $X_5=200$, $P_6=10$) was added to an aqueous solution of PVA with a degree of saponification of 95% and a degree of polymerization of 300 so that the ratio by weight of PVA to the organic boron polymer would be 3:7, and the mixture was stirred for 30 minutes at 40°–50° C., giving an aqueous solution. To the aqueous dispersion that contained the polyurethane was added the aqueous solution, so that the ratio by weight of the polyurethane and the mixture of PVA and the organic boron polymer would be 100:150, and the mixture obtained was diluted with ethyl alcohol, resulting in a coating liquid that has 4.5% solids.

This coating liquid was applied to a cellulose acetate film by the use of an air knife coater, and the film was dried in a heated draft at 100° C., resulting in a coated cellulose acetate film with a coating of 0.3 g/m². The film obtained was evaluated by the methods of Example 12 for adhesiveness to polyvinyl alcohol and for slipperiness. Results comparable to those in Example 12 were obtained.

EXAMPLE 17

(A) Preparation of Acrylic Resin

The same procedure was repeated as in section A of Example 9 to obtain a latex acrylic resin.

(B) Preparation and Evaluation of a Thermoplastic Laminated Film

An organic boron polymer (I-1; $P_1=1000$) was added to an aqueous solution of PVA with a degree of saponification of 80% and a degree of polymerization of 1000 so that the ratio by weight of the PVA to the organic boron polymer would be 1:9, and the mixture was stirred for 30 minutes at 40°–50° C., giving an aqueous solution. To 1000 parts by weight of the latex obtained in section A, this aqueous solution was added so that the ratio by weight of the acrylic resin and the mixture of PVA and the organic boron polymer would be 2:1, and then water was added so that the total weight of the mixture would be 3000 parts by weight. This coating liquid was applied to a polyethylene naphthalate film, which was dried at 100° C., and further heat-treated while being stretched at 150° C. This film was then evaluated by the methods of Example 12 for its adhesiveness to PVA and for slipperiness. Results comparable to those of Example 12 were obtained.

EXAMPLE 18

To an aqueous dispersion of polyester obtained as described in section A of Example 1, an organic boron polymer (I-1; $P_1=1000$), and a mixture of PVA (degree of saponification, 88%; degree of polymerization, 500) and an organic boron polymer (I-8, $P_8=2$) were added to prepare a coating liquid. The ratio by weight of the polyester, the organic boron polymer I-1, and the mixture in the coating liquid was 100:15:15; and the ratio by weight of the PVA and the organic boron polymer I-8 in the mixture was 1:4. The coating liquid obtained was used to prepare a film by the methods of Example 1, and the film was evaluated as in Example 1. The number of square remaining was 100.

EXAMPLE 19

The same procedure was repeated as in Example 12 except that the organic boron polymer used was compound II-1 ($X_7=10$; $P_9=10$). The number of squares remaining was 100.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A thermoplastic laminated film comprising a base film made of thermoplastic resin and a layer formed on at least one side of said base film sufficient to increase the adhesiveness of said base film to hydrophilic polymers, hydrophobic polymers and inorganic substances, wherein said layer is made of a composition comprising (a) at least one natural or synthetic film-forming material which is soluble, emulsifiable or dispersible in water and (b) an organic boron polymer or a mixture composed of about 5:95 to about 95:5 by weight of an organic boron polymer and vinyl alcohol polymer, wherein said vinyl alcohol polymer is equivalent to polyvinyl alcohol with a degree of saponification of at least 70% and a degree of polymerization of at least 100, said organic boron polymer being at least one of the polymers having a repeating unit I or II:

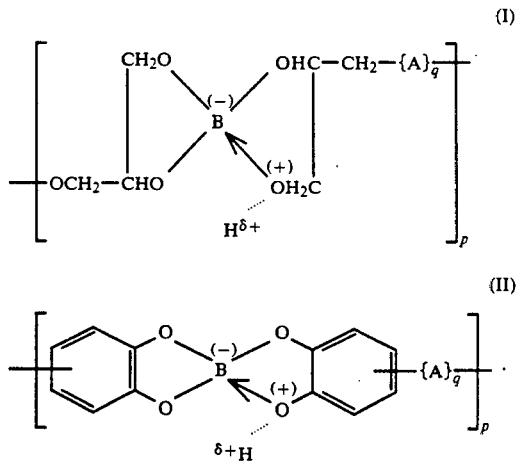

wherein p is 10 to 10,000; q is 0 or 1; and when q is 1, A is —(X)$_l$—(Y)$_m$—(Z)$_n$—, wherein X and Z are independently hydrocarbon groups with an ether linkage and containing 100 carbon atoms or less; Y is

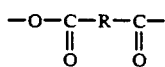

wherein R is a hydrocarbon group containing 1 to 34 carbon atoms, or

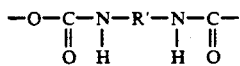

wherein
- R' is a hydrocarbon group containing 2 to 13 carbon atoms, and
- l, m, and n are independently 0 or 1, wherein the relative proportion by weight of (a) to (b) is about 95:5 to about 5:95.

2. A thermoplastic laminated film according to claim 1, wherein said water-soluble film-forming material is selected from the group consisting of starch and hydrolysis products thereof, sodium alginate, proteins, cellulose-type resins, epoxy resins, acrylic resins, polyester resins, polyurethane resins, polyamide resins, phenol resins, urea resins, melamine resins, silicone resins, polyolefin resins, and polyether resins.

3. A thermoplastic laminated film according to claim 2, wherein said water-soluble film-forming material is selected from the group consisting of acrylic resins, polyester resins and polyurethane resins.

4. A thermoplastic laminated film according to claim 1, wherein said water-emulsifiable, film-forming material is selected from the group consisting of rubbers, polyolefins, vinyl resins, acrylic resins, polyether resins, polyurethane resins, phenol resins, urea resins, melamine resins, furan resins, alkyd resins, unsaturated polyester resins, alkyd resins, unsaturated polyester resins, diallyl phthalate resins, epoxy resins, polystyrene, acrylonitrile-butadiene-styrene copolymer, fluorocarbon resins, polyamide resins, polyacetal resins, polycarbonate, polyphenylene oxide, polysulfone, cellulose-type resins, proteins, polyether resins, and polyphenylenesulfide.

5. A thermoplastic laminated film according to claim 4, wherein said water emulsifiable, film-forming material is selected from the group consisting of acrylic resins, polyester resins and polyurethane resins.

6. A thermoplastic laminated film according to claim 1, wherein said water-dispersible, film-forming material is selected from the group consisting of rubbers, polyolefins, vinyl resins, acrylic resins, polyether resins, polyurethane resins, phenol resins, urea resins, melamine resins, furan resins, alkyd resins, unsaturated polyester resins, diallyl phthalate resins, epoxy resins, polystyrene, acrylonitrile-butadiene-styrene copolymer, fluorocarbon resins, polyamide resins, polyacetal resins, polycarbonate, polyphenylene oxide, polysulfone, cellulose-type resins, proteins, polyether resins, silicone resins and polyphenylenesulfide.

7. A thermoplastic laminated film according to claim 6, wherein said water-dispersible, film-forming material is selected from the group consisting of acrylic resins, polyester resins and polyurethane resins.

8. A thermoplastic laminated film according to claim 1, wherein said composition further comprises at least one additive selected from the group consisting of antistatic agents, crosslinking agents, and inert particles.

* * * * *